(12) United States Patent
Kitaoka

(10) Patent No.: US 8,207,074 B2
(45) Date of Patent: Jun. 26, 2012

(54) OPTICAL GLASS

(75) Inventor: Kenji Kitaoka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 102 days.

(21) Appl. No.: 12/767,109

(22) Filed: Apr. 26, 2010

(65) Prior Publication Data

US 2010/0273633 A1    Oct. 28, 2010

(30) Foreign Application Priority Data

Apr. 27, 2009   (JP) ................. 2009-108052

(51) Int. Cl.
*C03C 3/16* (2006.01)
(52) U.S. Cl. ............... 501/45; 501/46; 501/47
(58) Field of Classification Search ........... 501/45, 501/46, 47
See application file for complete search history.

(56) References Cited

U.S. PATENT DOCUMENTS

| | | | |
|---|---|---|---|
| 6,875,714 B2 * | 4/2005 | Izuki ............... | 501/45 |
| 7,141,525 B2 * | 11/2006 | Yamamoto et al. ......... | 501/45 |

FOREIGN PATENT DOCUMENTS

| | | |
|---|---|---|
| JP | 2003-321245 | 11/2003 |
| JP | 2005-8518 | 1/2005 |
| JP | 2006-111499 | 4/2006 |
| JP | 2007-15904 | 1/2007 |

* cited by examiner

*Primary Examiner* — Karl Group
(74) *Attorney, Agent, or Firm* — Oblon, Spivak, McClelland, Maier & Neustadt, L.L.P.

(57) ABSTRACT

The present invention relates to an optical glass containing, in terms of mass % on an oxide basis, $P_2O_5$: from 10 to 18%; $Bi_2O_3$: from 37 to 64%; $Nb_2O_5$: from 5 to 25%; $Na_2O$: from more than 4.1 to 10%; $K_2O$: from 0 to 2%; $Li_2O$: from 0 to 0.2%; $WO_3$: from 0 to less than 20%; $TiO_2$: from 0 to 3%; and $B_2O_3$: from 0 to 2%, and having a refractive index $n_d$ of 1.98 or more and an Abbe's number $v_d$ of 20 or less.

17 Claims, No Drawings

OPTICAL GLASS

FIELD OF THE INVENTION

The present invention relates to a phosphate optical glass having a high refractive index, capable of being subjected to precision press molding, and being excellent in the plate formability or gob moldability for a preform.

BACKGROUND OF THE INVENTION

As regards a lead-free optical glass having a high refractive index and a high dispersion region, a phosphate system has been proposed, for example, in Patent Documents 1 and 2, but almost none have been specifically proposed for a composition having a refractive index ($n_d$) of more than 1.98.

A higher refractive index ($n_d$) enables obtaining a lens of larger power and is preferred, nevertheless, as for an optical glass having a high refractive index of more than 1.98, only a few phosphate systems free of lead or tellurium which are an environmentally hazardous substance have been proposed in Patent Documents 3 and 4.

Patent Document 3 proposes a lead-free phosphate optical glass having a high refractive index and a low Abbe's number, where, however, the composition satisfying the condition of $n_d$ being 1.98 or more has as high a liquidus temperature ($L_T$) as 920° C. or more and may be insufficient in the devitrification resistance.

Furthermore, the optical glass proposed in Patent Documents 3 and 4 is a glass containing large amounts of Ti, W, Bi and the like that affect the absorption in the visible region due to a change in the valence, and if the liquidus temperature ($L_T$) is excessively high, the glass cannot be sufficiently retained at a low temperature, and a melt in a redox state before performing plate formation or gob molding by discharging the glass cannot be controlled to an oxidation state advantageous in enhancing the transmittance of glass (with Ti, W or Bi, when the valence is high, the degree of coloration is small and in turn, the transmittance is high) and is liable to remain in a reduction state giving a bad transmittance, as a result, a high transmission characteristic important as an optical glass cannot be satisfied.

Patent Document 1: JP-A-2003-321245
Patent Document 2: JP-A-2005-8518
Patent Document 3: JP-A-2007-15904
Patent Document 4: JP-A-2006-111499

SUMMARY OF THE INVENTION

An object of the present invention is to provide an optical glass that has optical constants of a refractive index ($n_d$) of 1.98 or more and an Abbe's number ($v_d$) of 20 or less, is easy to be subjected to precision press molding because of its low glass transition point, has a liquidus viscosity suitable for gob moldability for a preform, and is excellent in the transmission characteristic.

The present invention provides an optical glass containing, in terms of mass % on an oxide basis, $P_2O_5$: from 10 to 18%;
$Bi_2O_3$: from 37 to 64%;
$Nb_2O_5$: from 5 to 25%;
$Na_2O$: from more than 4.1 to 10%;
$K_2O$: from 0 to 2%;
$Li_2O$: from 0 to 0.2%;
$WO_3$: from 0 to less than 20%;
$TiO_2$: from 0 to 3%; and
$B_2O_3$: from 0 to 2%, and having a refractive index $n_d$ of 1.98 or more and an Abbe's number $v_d$ of 20 or less. Incidentally, unless otherwise indicated, the lower limit in the numerical range of the chemical composition above indicates the numerical value or more, and the upper limit indicates the numerical value or less.

The phosphate optical glass of the present invention (hereinafter referred to as "the glass of the invention") contains $P_2O_5$, $Bi_2O_3$, $Nb_2O_5$ and $Na_2O$ as essential components, so that optical properties of a refractive index $n_d$ of 1.98 or more and an Abbe's number $v_d$ of 20 or less can be obtained.

The glass of the invention contains an appropriate amount of $Na_2O$, contains no BaO and contains no $TiO_2$ or contains $TiO_2$ to a small content, if at all, and in the case of containing large amounts of $WO_3$ and $Bi_2O_3$, is reduced in the liquidus temperature so as to stabilize the glass, whereby a glass melt in a redox state can be controlled to raise the transmittance and a lens having a high transmittance required as an optical material can be obtained.

DETAILED DESCRIPTION OF THE INVENTION

The present invention is based on the results of various studies to obtain a high-transmittance optical glass with a refractive index of 1.98 or more and an Abbe's number of 20 or less.

As a result of studies, it has been found that an objective of the invention can be attained by containing $P_2O_5$, $Bi_2O_3$, $Nb_2O_5$, $WO_3$ and $Na_2O$ with good balance and containing none of $K_2O$, $Li_2O$ and $TiO_2$ or containing such a component to a small content, if at all. The reasons for setting the range of each component in the glass of the invention are as follows. Here, in the context of the present invention, unless otherwise indicated, % means mass %. Also, the chemical composition is on an oxide basis.

In the glass of the invention, $P_2O_5$ is an essential component and is not only a main component to form a glass (glass-forming oxide) but also a component for increasing the viscosity of the glass. In the glass of the invention, if the $P_2O_5$ content is too small, the glass becomes unstable and at the same time, may be reduced in the viscosity. For this reason, the $P_2O_5$ content in the glass of the invention is 10% or more. The $P_2O_5$ content is preferably 13% or more, more preferably 13.5% or more. On the other hand, if the $P_2O_5$ content is excessively large, the refractive index is decreased. Therefore, the $P_2O_5$ content in the glass of the invention is 18% or less. The $P_2O_5$ content is preferably 17.2% or less, more preferably 15.8% or less.

In the glass of the invention, $Bi_2O_3$ is an essential component and has an effect of not only raising the refractive index of the glass but also softening the glass. If the content thereof is too small, the effect above may be insufficient. For this reason, the $Bi_2O_3$ content in the glass of the invention is 37% or more. The $Bi_2O_3$ content is preferably 40% or more, more preferably 44% or more. On the other hand, if the $Bi_2O_3$ content is excessively large, the viscosity as well as the transmittance on the short wavelength side are decreased. Therefore, the $Bi_2O_3$ content in the glass of the invention is 64% or less. The $Bi_2O_3$ content is preferably 57% or less, more preferably 45% or less.

In the glass of the invention, $Nb_2O_5$ is an essential component and has an effect of raising the refractive index of the glass. If the content thereof is too small, the effect above may be insufficient. For this reason, the $Nb_2O_5$ content in the glass of the invention is 5% or more. The $Nb_2O_5$ content is preferably 11% or more, more preferably 19% or more. On the other hand, if the $Nb_2O_5$ content is large, the glass becomes unstable. Therefore, the $Nb_2O_5$ content in the glass of the invention is 25% or less. The $Nb_2O_5$ content is preferably 24% or less, more preferably 23% or less.

In the glass of the invention, $Na_2O$ is an essential component and is not only a component to soften the glass but also one of components for stabilizing the glass. If the $Na_2O$ content in the glass of the invention is too small, the glass may become unstable. For this reason, the $Na_2O$ content in the glass of the invention is more than 4.1% (not including 4.1%). The $Na_2O$ content is preferably 4.2% or more, more preferably 4.3% or more.

On the other hand, if the $Na_2O$ content is large, the refractive index is decreased. Therefore, the $Na_2O$ content in the glass of the invention is 10% or less. The $Na_2O$ content is preferably 8% or less, more preferably 6% or less.

In the glass of the invention, $K_2O$ is a component to soften the glass and is an optional component. If the $K_2O$ content is large, the refractive index is decreased and at the same time, the glass becomes unstable. For this reason, in the case of containing $K_2O$ in the glass of the invention, the content thereof is 2% or less.

In the glass of the invention, $Li_2O$ is an optional component. If the $Li_2O$ content exceeds 0.2%, the viscosity is excessively decreased and at the plate formation or gob molding, striae may be readily produced to reduce the non-defective ratio. For this reason, in the case of containing $Li_2O$, the content thereof is 0.2% or less.

In the glass of the invention, $WO_3$ has an effect of raising the refractive index of the glass and is an optional component. If the content thereof is too small, the effect above is decreased. For this reason, in the case of containing $WO_3$, the content thereof is preferably 10% or more. The $WO_3$ content is more preferably 12.0% or more.

On the other hand, if the $WO_3$ content is large, the light transmission characteristic in the visible region is decreased and at the same time, the glass becomes unstable. Therefore, the $WO_3$ content in the glass of the invention is less than 20%. The $WO_3$ content is preferably 19.5% or less, more preferably 15.0% or less.

In the glass of the invention, $TiO_2$ has an effect of forming a glass and at the same time, raising the refractive index of the glass and is an optional component to adjust the refractive index ($n_d$) and the Abbe's number ($v_d$). For example, when 1 cation % of P is replaced by Ti, $n_d$ is increased by about 0.012 and $v_d$ is decreased by about 0.4. When 1 cation % of Bi that is a high refractive index component is replaced by Ti, $n_d$ is decreased by about 0.0003 and $v_d$ is decreased by about 0.1. In this way, the dispersion adjustment can be controlled according to the purpose.

On the other hand, if the $TiO_2$ content is large, the light transmission characteristic in the visible region is decreased and at the same time, the glass transition point is raised. Furthermore, the glass becomes unstable and the liquidus temperature becomes high. Therefore, in the case of containing $TiO_2$ in the glass of the invention, the content thereof is 3% or less. It is preferred that the $TiO_2$ content is substantially 0%.

In the glass of the invention, $B_2O_3$ is a component to form a glass and at the same time, is an optional component used for adjusting the refractive index ($n_d$) and the Abbe's number ($v_d$). For example, 1 cation % of P is replaced by B, $n_d$ is increased by about 0.0003 and the $v_d$ is decreased by about 0.1. On the other hand, if the $B_2O_3$ content is excessively large, the refractive index is decreased. Therefore, in the case of containing $B_2O_3$ in the glass of the invention, the content thereof is 2% or less. The $B_2O_3$ content is preferably 1.8% or less.

In the glass of the invention, $SiO_2$ is a component to form a glass and is an optional component. In the case of adding this component, in view of glass transition point and refractive index, the $SiO_2$ content is preferably 1% or less.

In the glass of the invention, the total of the above-described components is preferably 95% or more, because various properties are well balanced. The total of the components is more preferably 98% or more, and above all, the glass of the invention is preferably composed of substantially the above-described components. Incidentally, the term "composed of substantially the above-described components" means that the glass is "composed of the above-described components excluding unavoidable impurities".

In the glass of the invention, in order to adjust the optical properties, any one or more of $Al_2O_3$, $GeO_2$, $Ga_2O_3$, $ZrO_2$, $Gd_2O_3$, $La_2O_3$, $Y_2O_3$, $Ta_2O_5$, MgO, CaO and SrO can be further added as an optional component. If the content of such a component is small, the effect of adjusting the optical properties can be hardly obtained. For this reason, the content of each component alone is preferably 0.1% or more, more preferably 1.0% or more, still more preferably 2% or more. If the content of each component is large, the glass may become unstable. Also, since the raw material is relatively expensive, the content of such an element is preferably kept as small as possible. Accordingly, the content of each component alone is preferably 5.0% or less, more preferably 4.0% or less, still more preferably 3.0% or less.

In view of molding temperature, environmental effect and the like, the glass of the invention preferably contains substantially none of PbO, $TeO_2$, F and $As_2O_3$. In the glass of the invention, BaO has a tendency to make the glass unstable and it is concerned that the liquidus temperature thereof becomes high. If the liquidus temperature becomes high, there is a necessity to raise the temperature of a molten glass at the time of gob molding. Therefore, since the viscosity of the molten glass becomes low, there is a problem that the gob molding becomes difficult. In the context of the present invention, the term "contains substantially no component X" means that the component X is not positively added except for commingling as an avoidable impurity. The content as a measure is less than about 0.05%.

In the glass of the invention, $Sb_2O_3$ is not an essential component but can be added as a refining agent at the glass melting. The content thereof is preferably 1% or less, more preferably 0.5% or less, still more preferably 0.1% or less. In the case of adding $Sb_2O_3$ in the glass of the invention, the lower limit of its content is preferably 0.01% or more, more preferably 0.05% or more, still more preferably 0.1% or more.

As for optical properties of the glass of the invention, the refractive index ($n_d$) is 1.98 or more. The refractive index ($n_d$) of the glass of the invention is preferably 2 or more. On the other hand, for balancing various properties, the refractive index ($n_d$) of the glass of the invention is preferably 2.02 or less. For the same reason, the refractive index ($n_d$) is more preferably 2.01 or less.

The Abbe's number ($v_d$) of the glass of the invention is 20 or less. The Abbe's number ($v_d$) of the glass of the invention is preferably 19.2 or less. On the other hand, the Abbe's number ($v_d$) of the glass of the invention is preferably 18.7 or more, because it is difficult to obtain an Abbe's number of less than 18.5.

As for the light transmission characteristic of the glass of the invention, $\lambda_5$ is preferably on the shorter wavelength side as much as possible, and $\lambda_5$ is preferably 415 nm or less, more preferably 410 nm. Also, $\lambda_{70}$ is preferably 485 nm or less, more preferably 480 nm or less.

Here, $\lambda_5$ is defined as the wavelength at the transmittance of 5% and $\lambda_{70}$ is defined as the wavelength at the transmittance of 70%, when measuring the transmittance of the sample which is polished parallel and having a thickness of 1 cm by a spectrophotometer. $\lambda_5$ serves as an index indicating that short-wavelength light is transmitted to what wavelength region, and $\lambda_{70}$ serves as an index indicating how the sample transmits short-wavelength light in visible light range. When both the values of $\lambda_5$ and $\lambda_{70}$ increase, the transmission of the short-wavelength light becomes low, so that the transmitted light is tinged with from yellow to red, whereby the color reproducibility of the picture and the like become worse.

The glass transition point ($T_g$) of the glass of the invention is preferably 520° C. or less, and in this case, the molding temperature can be made low, bismuth (Bi) contained in a large amount as a high refractive index component in the glass can be prevented from bleeding out of the glass and attaching to the glass surface or mold to cause fogging of the lens surface, and moreover, a protective film or the like formed on the mold surface is enhanced in the durability. The glass transition point of the glass of the invention is more preferably 505° C. or less, still more preferably 490° C. or less. Even a 1° C. lower glass transition temperature is effective in suppressing the fogging due to Bi, whereby the productivity rises.

For the same reason as in the glass transition point ($T_g$), the deformation point (At) of the glass of the invention is preferably 545° C. or less. The deformation point of the glass of the invention is more preferably 540° C. or less, still more preferably 530° C. or less.

The liquidus temperature ($L_T$) of the glass of the invention is 905° C. or less. The melt before performing plate formation or gob molding by discharging glass is kept at a temperature slightly higher than $L_T$, whereby the melt in a redox state can be brought into an oxidation state advantageous in enhancing the transmittance of the glass (with Ti, W or Bi, when the valence is high, the degree of coloration is small and in turn, the transmittance is high) and an optical lens having a high transmittance can be obtained.

The liquidus viscosity ($\eta_{LT}$) of the glass of the invention is preferably 2.5 dPa·s to 20 dPa·s. If the liquidus viscosity thereof is less than 2.5 dPa·s, in the gob molding for a preform, there is a concern that nitrogen gas is caught in droplets of a molten glass when conducting floating of the droplets of the molten glass by nitrogen gas and cooling on a mold. On the other hand, if the liquidus viscosity thereof exceeds 20 dPa·s, when molding the gob for a preform and then cutting off it from the molten glass, cutting off property of the glass becomes worse and therefore, it becomes easy to generate the glass lint, thereby producing shape defective or quantity defective. Additionally, there is a concern that in case where the generated glass lint is caught in the gob, the defect such as striae is generated. If the liquidus viscosity of the glass excessively high, since there is a necessity to raise the temperature of the glass droplets in order to lower the viscosity thereof, it becomes easy to generate striae in the glass droplets.

The liquidus viscosity of the glass of the invention is further preferably 2.7 dPa·s or more and especially preferably 4 dPa·s or more. When giving preference to the other properties over the liquidus viscosity, the liquidus viscosity of the glass of the invention is preferably 15 dPa·s or less, and more preferably 10 dPa·s or less.

The glass of the invention is not particularly limited in its production method and can produced, for example, by weighing and mixing raw materials for use in a normal optical glass, such as oxide, hydroxide, carbonate, nitrate and phosphate, placing the resultant mixture in a crucible usually used for the production of an optical glass, such as platinum crucible, gold crucible, quartz crucible and alumina crucible, melting, refining and stirring the mixture at about 1,000 to 1,100° C. for 1 to 10 hours, keeping the resultant melt at a temperature slightly higher than $L_T$ to adjust the redox of the melt, casting the melt into a mold preheated to 400 to 500° C., and gradually cooling the cast product.

As for the way to adjust the redox state of the glass melt, an oxidative atmospheric gas is flowed into a platinum pipe, and the gas is sent into the melt to cause bubbling, whereby the transition metal can be brought into a high valence state and in turn, the transmittance can be enhanced. For example, an oxygen gas can be used. Thanks to introduction of this step, the time for which the melt is kept at a temperature slightly higher than the liquidus temperature ($L_T$) to adjust the redox state of the melt can be shortened.

Out of the above-described raw materials, also when an oxide introduced in the form of a carbonate, such as $Na_2CO_3$, is partially or entirely substituted for by $NaNO_3$ that is a nitrate, the glass melt can be made to become oxidizing and the transmittance can be enhanced ($\lambda_{70}$ can be shifted to a shorter wavelength). In order to make the glass to become oxidizing, it is preferred to lower the glass melting temperature. For example, lowering of the glass melting temperature by about 50° C. produces a great effect and this is preferred. The change of these conditions may be selected by taking into consideration the raw material cost and easiness to control the bubbling during production.

Examples of the method for gob molding for a preform using the glass of the invention include, but are not limited to, a method of discharging a molten glass from a tip of a nozzle, separating a desired mass of the molten glass gob, and receiving it on a mold while floating the gob with a nitrogen gas, thereby producing a glass gob with an all fire polished surface.

The method for forming the glass of the invention into an optical element is not particularly limited, but examples thereof include, but are not limited to, a method where a preform produced by gob molding for a preform based on the glass liquidus temperature ($L_T$) of the glass of the invention is set in a high-precision processed press mold (the mold material is, for example, SiC or carbide) having formed on the surface thereof a protective film, pressed under a predetermined pressure for a predetermined time, and thereby forming into a desired shape; and a method where the glass melt is discharged and once formed into a plate material, a glass gob suitable for press molding is produced from the plate material and used as a processed preform, and the processed preform is set in a press mold and then press-molded.

EXAMPLES

Working examples of the present invention and the like are described below. Examples 1 to 10 are working examples of the present invention.

Chemical Composition and Production Method of Sample

Raw materials were weighed to have a chemical composition (%) shown in Table 1. As for raw materials of each glass, $H_3PO_4$, $BPO_4$, $Ba(PO_3)_2$, $NaPO_3$ or $KPO_3$ was used for $P_2O_5$; $H_3BO_3$, $BPO_4$ or a combination thereof was used for $B_2O_3$; $BaCO_3$, $Ba(NO_3)_2$, $Ba(PO_3)_2$ or a combination thereof was used for BaO; $Li_2CO_3$, $LiPO_3$ or a combination thereof was used for $Li_2O$; $Na_2CO_3$, $NaNO_3$, $NaPO_3$ or a combination thereof was used for $Na_2O$; $K_2CO_3$, $KPO_3$ or a combination thereof was used for $K_2O$; and respective oxides were used for $SiO_2$, $Bi_2O_3$, $Nb_2O_5$, $WO_3$ and ZnO. Incidentally, in Example 8, $Na_2CO_3$ and $NaPO_3$ were used as raw materials of $Na_2O$. In Example 10, the same oxide composition as in Example 8 was formulated, but $NaNO_3$ was used in place of $Na_2CO_3$ as the raw material of $Na_2O$.

The raw materials weighed were mixed, and the mixture was placed in a platinum crucible having an inner volume of about 300 cc and melted at about 1,100° C. in Examples 1 to 9 or at about 1,050° C. in Example 10, for 1 to 1.5 hours. The obtained melt was refined, stirred, kept at 950° C. for 1 hour and then cast into a rectangular mold of 100 mm (length)×50 mm (width) preheated to approximately from 400 to 500° C. The cast product was gradually cooled at about 0.5° C./min and used as a sample.

Evaluation Method

The refractive index ($n_d$) is a refractive index to helium d line and was measured with a refractometer (KRP-2000, trade name, manufactured by Kalnew Optical Industries). The refractive index was measured down to five decimal places and is shown as a value having four decimal places by rounding off the fifth decimal place.

The Abbe's number ($v_d$) was calculated by $v_d=(n_d-1)/(n_F-n_C)$ and is shown by a value having one decimal place by rounding off the second decimal place. In the formula, $n_F$ and $n_C$ are refractive indexes to hydrogen F line and C line, respectively.

The glass transition temperature ($T_g$) and the deformation point (At) were determined by processing each obtained glass into a rod and measuring the glass transition temperature or deformation point with a thermal analyzer (TMA4000SA, trade name, manufactured by Bruker AXS) at a temperature rise rate of 5° C./min according to a thermal expansion method.

As for the liquidus temperature ($L_T$), about 5 g of a glass sample was placed in a platinum dish, kept at a temperature from 870° C. to 940° C. in 5° C. steps for 1 hour and allowed to naturally cool, the presence or absence of crystal precipitation was observed with a microscope, and the minimum temperature at which crystal was not observed was taken as the liquidus temperature.

The transmittance was measured on a 10 mm-thick sample whose both surfaces were polished, in 1-nm steps by using a spectrophotometer (Lambda 950, trade name, manufactured by Parkin Elmer Co., Ltd.).

As for the liquidus viscosity ($\eta_{LT}$), the viscosity was measured by a rotary cylinder method, and the viscosity at the liquidus temperature ($L_T$) was taken as the liquidus viscosity.

As for the melting property and the like of the glass, it was confirmed by observation with an eye during production of the sample above that there was no problem in melting property and the obtained glass sample was free of bubbles or striae.

TABLE 1

|  | No. | | | | |
| --- | --- | --- | --- | --- | --- |
|  | Example 1 | Example 2 | Example 3 | Example 4 | Example 5 |
| $P_2O_5$ | 14.98 | 14.73 | 14.49 | 14.37 | 13.80 |
| $Bi_2O_3$ | 41.64 | 40.95 | 40.28 | 49.45 | 56.64 |
| $Nb_2O_5$ | 23.30 | 20.69 | 18.16 | 16.92 | 11.05 |
| $Na_2O$ | 4.64 | 4.56 | 4.49 | 4.45 | 4.28 |
| $K_2O$ | 0.64 | 0.63 | 0.62 | 0.62 | 0.59 |
| $WO_3$ | 11.05 | 14.75 | 18.32 | 10.60 | 10.18 |
| $TiO_2$ | 1.97 | 1.94 | 1.91 | 1.89 | 1.82 |
| $B_2O_3$ | 1.78 | 1.75 | 1.72 | 1.70 | 1.64 |
| Total of composition | 100 | 100 | 100 | 100 | 100 |
| $n_d$ | 2.0021 | 1.9981 | 1.9970 | 2.0159 | 2.0138 |
| $v_d$ | 18.9 | 18.9 | 18.9 | 18.8 | 18.8 |
| $T_g$/° C. | 504 | 502 | 498 | 486 | 463 |
| $A_t$/° C. | 545 | 520 | 516 | 504 | 481 |
| $L_T$/° C. | 900 | 900 | 885 | 875 | 870 |
| $\eta_{LT}$/dPa·s | 2.9 | 2.9 | 3.8 | 4.3 | 5.1 |
| $\lambda_5$/nm | 404 | 408 | 406 | 407 | 407 |
| $\lambda_{70}$/nm | 465 | 479 | 476 | 474 | 478 |

TABLE 2

|  | No. | | | | |
| --- | --- | --- | --- | --- | --- |
|  | Example 6 | Example 7 | Example 8 | Example 9 | Example 10 |
| $P_2O_5$ | 17.18 | 14.27 | 14.20 | 15.78 | 14.20 |
| $Bi_2O_3$ | 41.13 | 44.40 | 44.93 | 44.55 | 44.93 |
| $Nb_2O_5$ | 23.02 | 20.05 | 19.95 | 21.90 | 19.95 |
| $Na_2O$ | 4.59 | 4.42 | 4.40 | 4.36 | 4.40 |
| $K_2O$ | 0.63 | 0.61 | 0.61 | 0.60 | 0.61 |
| $WO_3$ | 10.91 | 14.29 | 14.22 | 12.24 | 14.22 |
| $TiO_2$ | 1.95 | 0.26 | 0.00 | 0.00 | 0.00 |
| $B_2O_3$ | 0.59 | 1.69 | 1.69 | 0.56 | 1.69 |
| Total of composition | 100 | 100 | 100 | 100 | 100 |
| $n_d$ | 1.9887 | 1.9998 | 2.0001 | 2.0005 | 2.0001 |
| $v_d$ | 19.2 | 19.1 | 19.2 | 19.2 | 19.2 |
| $T_g$/° C. | 519 | 488 | 485 | 499 | 485 |
| $A_t$/° C. | 537 | 531 | 528 | 542 | 528 |
| $L_T$/° C. | 900 | 880 | 880 | 900 | 880 |
| $\eta_{LT}$/dPa·s | 2.8 | 4.1 | 4.1 | 2.9 | 4.1 |
| $\lambda_5$/nm | 402 | 407 | 405 | 403 | 405 |
| $\lambda_{70}$/nm | 469 | 475 | 474 | 471 | 463 |

While the invention has been described in detail and with reference to specific embodiments thereof, it will be apparent to one skilled in the art that various changes and modifications can be made therein without departing from the spirit and scope thereof.

This application is based on Japanese Patent Application No. 2009-108052 filed on Apr. 27, 2009, the entirety of which is incorporated herein by way of reference.

All references cited herein are incorporated by reference herein in their entirety.

The glass of the invention is an optical glass having a refractive index of 1.98 or more and is useful as a high-transmittance optical glass for precision press molding.

What is claimed is:

1. An optical glass comprising, in terms of mass % on an oxide basis:
   $P_2O_5$: from 10 to 18%;
   $Bi_2O_3$: from 37 to 64%;
   $Nb_2O_5$: from 5 to 25%;
   $Na_2O$: from more than 4.1 to 10%;
   $GeO_2$: from 0 to 5.0%;
   $K_2O$: from 0 to 2%;
   $Li_2O$: from 0 to 0.2%;
   $WO_3$: from 0 to less than 20%;
   $TiO_2$: from 0 to 3%; and
   $B_2O_3$: from 0 to 2%,
   wherein the optical glass has a refractive index $n_d$ of 1.98 or more and an Abbe's number $v_d$ of 20 or less.

2. The optical glass according to claim 1, wherein the optical glass contains substantially no BaO.

3. The optical glass according to claim 1, wherein the optical glass comprises from 10 to less than 20 mass % of $WO_3$.

4. The optical glass according to claim 1, wherein the optical glass has a liquidus temperature of 905° C. or less.

5. The optical glass according to claim 1, wherein the optical glass has $\lambda_5$ of 415 nm or less.

6. The optical glass according to claim 1, wherein the optical glass comprises from 13% to 17.2% of $P_2O_5$.

7. The optical glass according to claim 1, wherein the optical glass comprises from 13.5% to 15.8% of $P_2O_5$.

8. The optical glass according to claim 1, wherein the optical glass comprises from 13% to 17.2% of $P_2O_5$ and from 0% to 1.8% of $B_2O_3$.

9. The optical glass according to claim 1, wherein the optical glass comprises from 13.5% to 15.8% of $P_2O_5$ and from 0% to 1.8% of $B_2O_3$.

10. The optical glass according to claim 1, wherein a sum of $P_2O_5$, $B_2O_3$ and $GeO_2$ is from 15.44% to 17.77%.

11. The optical glass according to claim 1, wherein the optical glass comprises from 0.1% to 3.0% of $GeO_2$.

12. The optical glass according to claim 1, further comprising from 0.01% to 1% of $Sb_2O_3$.

13. The optical glass according to claim 1, further comprising from 0.05% to 0.1% of $Sb_2O_3$.

14. The optical glass according to claim 1, wherein the optical glass has $\lambda_{70}$ of 485 nm or less.

15. The optical glass according to claim 1, wherein the optical glass has a glass transition point of 520° C. or less.

16. The optical glass according to claim 1, wherein the optical glass has a liquidus viscosity of 2.5 dPa·s to 20 dPa·s.

17. The optical glass according to claim 1, wherein the optical glass has a liquidus viscosity of 4 dPa·s to 10 dPa·s.

* * * * *